United States Patent
Fudouji

(10) Patent No.: US 8,534,061 B2
(45) Date of Patent: Sep. 17, 2013

(54) DUMP TRUCK

(75) Inventor: Takashi Fudouji, Kazo (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 13/521,170

(22) PCT Filed: Feb. 1, 2012

(86) PCT No.: PCT/JP2012/052232
§ 371 (c)(1),
(2), (4) Date: Jul. 9, 2012

(87) PCT Pub. No.: WO2012/172826
PCT Pub. Date: Dec. 20, 2012

(65) Prior Publication Data
US 2012/0317968 A1 Dec. 20, 2012

(30) Foreign Application Priority Data
Jun. 16, 2011 (JP) .................................. 2011-134436

(51) Int. Cl.
*F16D 31/02* (2006.01)

(52) U.S. Cl.
USPC .................... 60/468; 60/419; 60/430; 60/456

(58) Field of Classification Search
USPC .................. 60/337, 339, 358, 419, 421, 428, 60/430, 435, 456, 468, 494
See application file for complete search history.

(56) References Cited

U.S. PATENT DOCUMENTS

| | | | |
|---|---|---|---|
| 4,321,793 A | 3/1982 | Uranaka et al. | |
| 4,517,800 A * | 5/1985 | Karakama et al. | ............... 60/421 |

FOREIGN PATENT DOCUMENTS

| | | |
|---|---|---|
| JP | 1980-087639 A | 7/1980 |
| JP | 1984-072160 U1 | 5/1984 |
| JP | 1988-305044 A | 12/1988 |
| JP | 1990-144249 A | 6/1990 |
| JP | 1991-079464 A | 4/1991 |
| JP | H04-071829 U | 6/1992 |

* cited by examiner

*Primary Examiner* — Michael Leslie
(74) *Attorney, Agent, or Firm* — Fish & Richardson P.C.

(57) ABSTRACT

A dump truck includes: an oil-cooling center brake; a first hydraulic pump supplying cooling oil to the center brake; a second hydraulic pump supplying cooling oil to the center brake in addition to the cooling oil from the first hydraulic pump; a hydraulic motor driving the second hydraulic pump; a third hydraulic pump supplying hydraulic oil to the hydraulic motor; an open/close valve letting the hydraulic oil bypass the hydraulic motor; and a controller controlling a bypass flow amount at the open/close valve. A capacity of the first hydraulic pump corresponds to a flow amount of the cooling oil required to lubricate a transmission. A capacity of the second hydraulic pump corresponds to a flow amount for compensating the cooling oil from the first hydraulic pump when a brake is off. A capacity of the third hydraulic pump is smaller than the capacity of the second hydraulic pump.

5 Claims, 4 Drawing Sheets

DUMP TRUCK

CROSS-REFERENCE TO RELATED APPLICATIONS

This application claims priority to Application No. PC/JP2012/052232 filed Feb. 1, 2012, which application claims priority to Japanese Application No. 2011-134436, filed on Jun. 16, 2011. The contents of the above applications are incorporated herein by reference in their entireties.

TECHNICAL FIELD

The invention relates to a dump truck. More specifically, it relates to a dump truck that cools a braking system by cooling oil supplied to a transmission.

BACKGROUND ART

Conventionally, some dump trucks use a braking system for a service brake that functions by operating a brake pedal as a retarder when driving downhill and under other conditions. In other words, when a retarder control lever or a retarder switch is turned on, the braking system starts operating as a retarder to brake a dump truck.

When a multi-disc wet brake is adopted as such a braking system, cooling oil is supplied to absorb heat generated when braking. The cooling oil is provided by lubricating oil of a transmission that transmits power from an engine to wheels and is fed from an oil pan of the transmission via a hydraulic pump driven by the engine.

An amount of cooling oil supplied varies significantly between when the retarder is used and when the retarder is not used. Since a more than necessary amount of cooling oil increases loss of power in a braking system and reduces fuel efficiency, excessive cooling oil bypasses the braking system via a brake cooling valve (an electromagnetic proportional valve) when the retarder is not used, so that loss of power is reduced and fuel efficiency is improved (See Patent Literature 1).

CITATION LIST

Patent Literature(s)

Patent Literature 1: JP-U-4-71829

SUMMARY OF THE INVENTION

Problem(s) to be Solved by the Invention

However, in Patent Literature 1, even during normal driving conditions when a retarder is not used, a hydraulic pump constantly discharges cooling oil of the same flow amount as when a retarder is used, causing a hydraulic pump of large capacity to be driven at all times, so that power consumed by the hydraulic pump increases, thus posing limitations on an improvement in fuel efficiency.

An object of the invention is to provide a dump truck capable of increasing fuel efficiency by cutting power consumed by a hydraulic pump when a braking system is not in operation.

Means for Solving the Problem(s)

A dump truck according to a first aspect of the invention includes: a cooling oil tank for storing cooling oil; a braking system to which the cooling oil is supplied; and a transmission to which the cooling oil is supplied via the braking system. The dump truck further includes: a first hydraulic pump that is driven by an engine and supplies the cooling oil in the cooling oil tank to the braking system and the transmission; a second hydraulic pump that supplies the cooling oil in the cooling oil tank, in addition to the cooling oil from the first hydraulic pump, to the braking system and the transmission; a hydraulic motor of which output axis is connected to an input axis of the second hydraulic pump; a hydraulic oil tank for storing hydraulic oil; a third hydraulic pump that is driven by the engine and supplies the hydraulic oil in the hydraulic oil tank to the hydraulic motor; a flow amount adjuster that is provided along a bypass channel that lets a predetermined amount of the hydraulic oil from the third hydraulic pump bypass the hydraulic motor and adjusts a bypass flow amount in the bypass channel; and a controller that controls the bypass flow amount at the flow amount adjuster based on a brake status in the braking system, a capacity of the first hydraulic pump corresponding to a flow amount of the cooling oil required to lubricate the transmission, a capacity of the second hydraulic pump corresponding to a flow amount of the cooling oil to make up for the cooling oil from the first hydraulic pump in order to provide the cooling oil supplied when the braking system is in operation, and a capacity of the third hydraulic pump being smaller than a capacity of the second hydraulic pump.

In a dump truck according to a second aspect of the invention, the controller determines a brake status in the braking system based on operational signals from a brake operating unit.

In the dump truck according to a third aspect of the invention, the controller controls a bypass flow amount at the flow amount adjuster based on an oil temperature of the cooling oil.

In the dump truck according to a fourth aspect of the invention, the controller controls a bypass flow amount at the flow amount adjuster based on a speed of the engine.

According to the first aspect of the invention, a combined flow amount of cooling oil from the first and second hydraulic pumps is the flow amount required to cool the braking system. Conventionally, a hydraulic pump of a large capacity equivalent to the combined capacity of the first and second hydraulic pumps is driven even when a braking system is not operated. In contrast, in the first aspect of the invention, the hydraulic motor may be halted to keep the second hydraulic pump from being driven by adjusting the bypass flow amount in the bypass channel when the brake system is out of operation, so that a cooling oil necessary to lubricate the transmission can be supplied.

In other words, according to the first aspect of the invention, the first and third hydraulic pumps are driven at all times. In this case, although a pump consumption power to drive the first hydraulic pump is the same as in conventional systems, since the third hydraulic pump may be of low capacity and low pressure, significantly small consumption power is required for driving the third hydraulic pump. Hence, even when the first and third hydraulic pumps are combined, a total of pump consumption power can be substantially reduced, resulting in an improvement in fuel efficiency.

According to the second aspect of the invention, a brake pedal of a service brake, a retarder control lever of a retarder and the like can be used as the brake operating unit. Accordingly, with the brake status determined based on the operational signals from the brake operating unit, the bypass flow amount is reduced to zero at the flow amount adjuster when a brake is on, so that all hydraulic oil from the third hydraulic pump can be supplied for the hydraulic motor and the second hydraulic pump to be driven. In contrast, when a brake is off, all the hydraulic oil bypasses the hydraulic motor, so that the driving of the hydraulic motor and the second hydraulic pump come to a halt.

When cooling oil has a low oil temperature and high viscosity, an inner pressure in a cooling oil chamber of the braking system easily rises, so that floating seal could be damaged and cooling oil could leak out.

According to the third aspect of the invention, when an oil temperature is so low that such trouble could occur, the controller lets the hydraulic oil bypass via the flow amount adjuster, thereby restraining a rise in an inner pressure in the cooling oil chamber by suspending a supply of the cooling oil from the second hydraulic pump, so that damage to floating seal and consequent leakage of cooling oil to an outside can be prevented.

A rise in an inner pressure in the cooling oil chamber may also be caused by an oversupply of the cooling oil.

Hence, in the fourth aspect of the invention, even when an engine speed increases to, for instance, a rated speed or higher and a flow amount of the cooling oil discharged from the first and second hydraulic pumps comes close to an oversupply, the controller can adjust an amount of the hydraulic oil via the flow amount adjuster toward a state in which the hydraulic oil bypasses and then can reduce a supply of the cooling oil from the second hydraulic pump so that an inner pressure in the cooling oil chamber can be restrained. According to the above arrangement, damage to floating seal and leakage of cooling oil can also be prevented.

BRIEF DESCRIPTION OF DRAWING(S)

DESCRIPTION OF EXEMPLARY EMBODIMENT(S)

An exemplary embodiment of the invention will be described below with reference to drawings.

Figure 1:
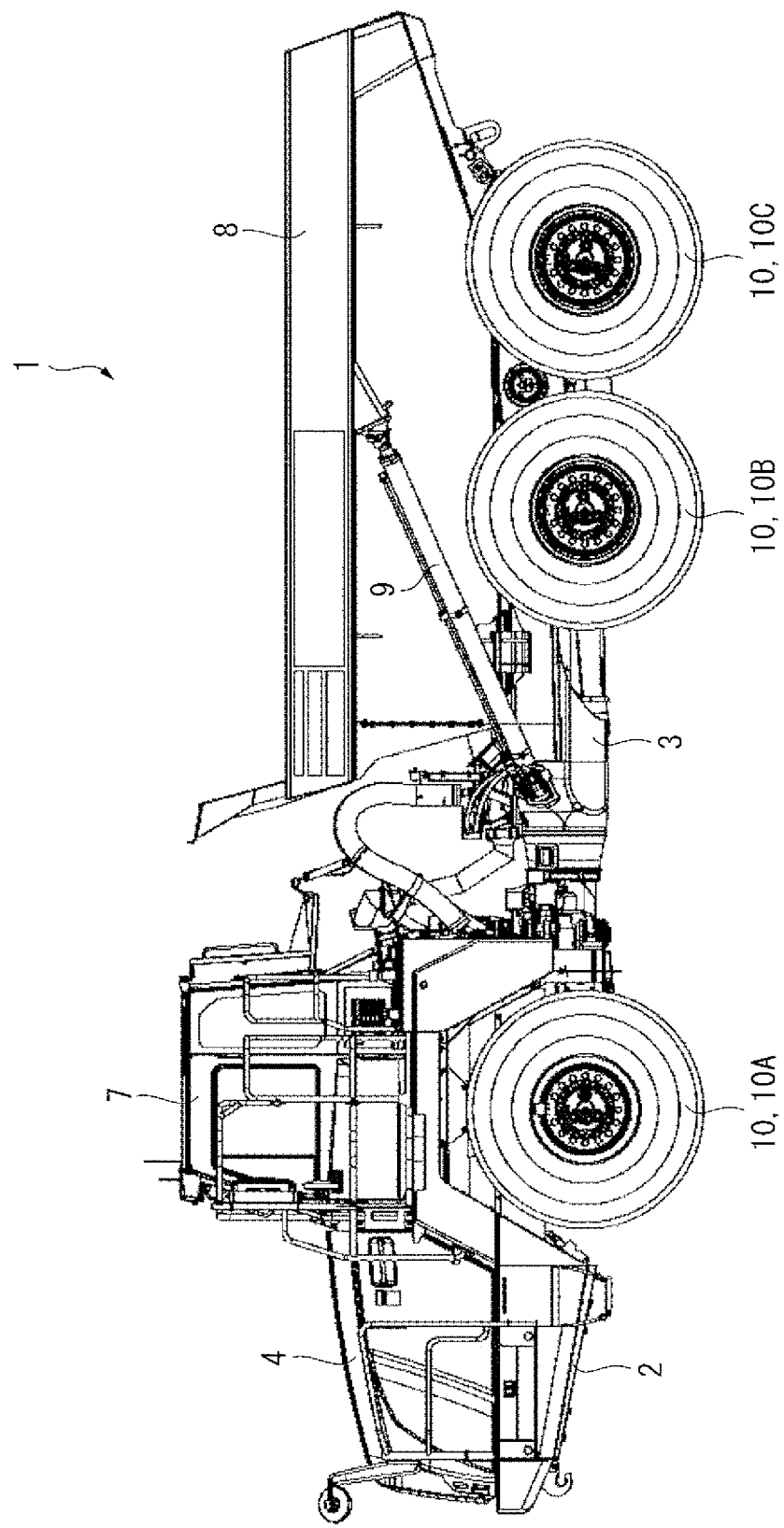
FIG. 1 is a side view of an entire dump truck according to an exemplary embodiment of the invention.
Figure 2:
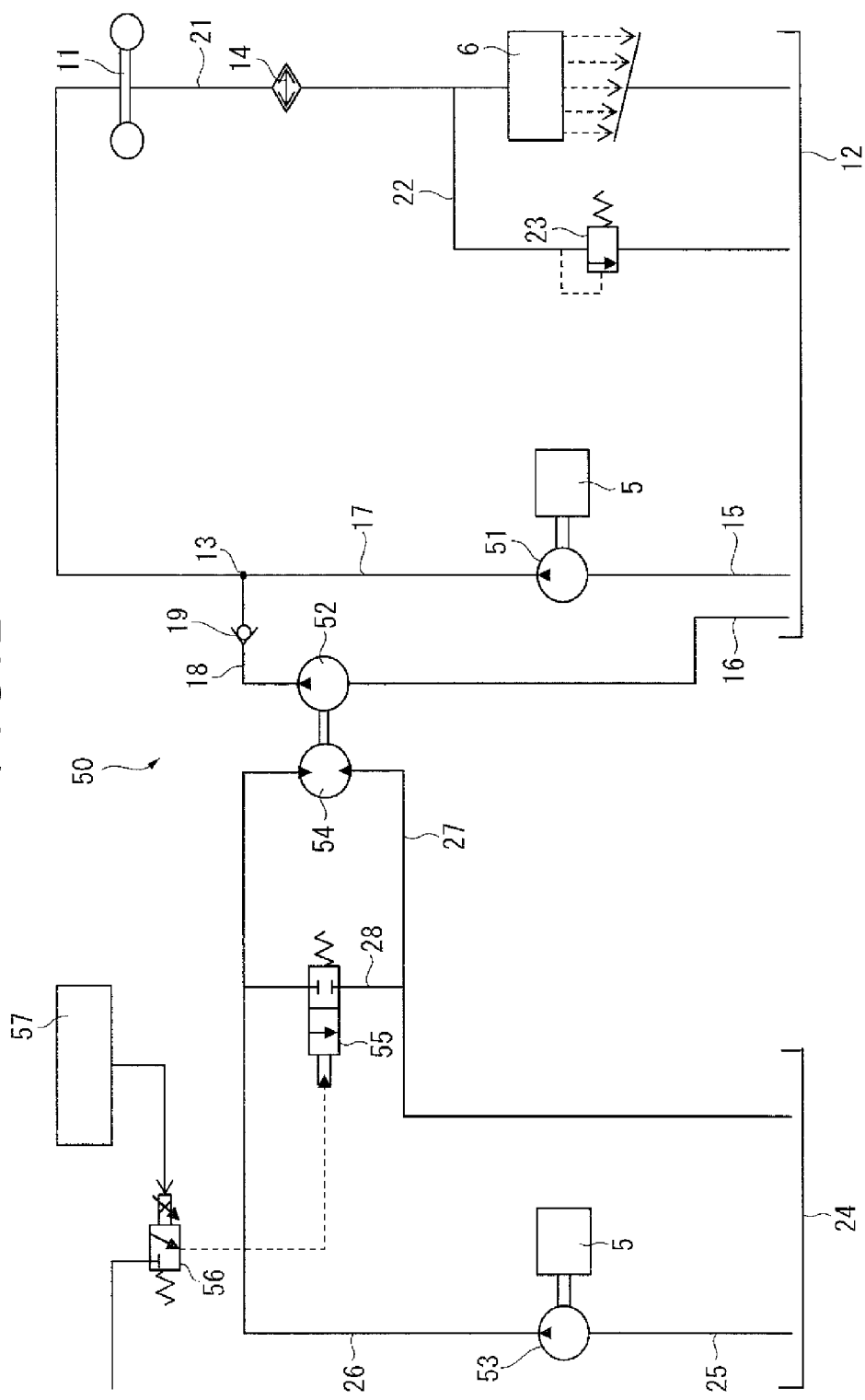
FIG. 2 illustrates a hydraulic circuit that constitutes a cooling system according to the exemplary embodiment.

As shown in FIGS. 1 and 2, a dump truck 1 constitutes an articulated dump truck in which a front frame 2 and a rear frame 3 are connected in a manner that allows articulation.

An engine 5 (FIG. 2) that is covered by a hood 4 is installed at a front part of the front frame 2 of the dump truck 1. A transmission 6 (FIG. 2) is installed at a rear part of the front frame 2, and a cab 7 is provided above the transmission 6.

A body 8 is installed on the rear frame 3. The body 8 is lifted up and down against the rear frame 3 by a pair of right and left hydraulic actuators 9.

A pair of right and left front wheels 10 (front wheels 10A) are provided on the front frame 2, while a pair of right and left front rear wheels 10 (front rear wheels 10B) and rear rear wheels 10 (rear rear wheels 10C) are each provided on the rear frame 3, where all the six wheels are driven. A cooling system 50 according to this exemplary embodiment is applied to a center brake 11 that serves as a braking system for the front rear wheels 10B from among the six wheels.

The invention is not limited to articulated dump trucks, but can also be applied to a dump truck with a body that does not allow articulation.

The following is a description of the cooling system 50 with reference to a hydraulic circuit in FIG. 2.

The cooling system 50 includes: a first hydraulic pump 51 that is driven by the engine 5; a second hydraulic pump 52 that is driven by a hydraulic motor 54; and a third hydraulic pump that feeds hydraulic oil to the hydraulic motor 54. The third hydraulic pump 53 is driven by the engine 5. An output shaft of the hydraulic motor 54 is connected to an input shaft of the second hydraulic pump 52 via a joint.

The first hydraulic pump 51 and the second hydraulic pump 52 suck and pump cooling oil in an oil pan 12 that functions as a cooling oil tank provided to the transmission 6. Cooling oil discharged from the first and second hydraulic pumps 51 and 52 converges at a junction 13 and is fed to and cools the center brake 11. Cooling oil after cooling is sent to an oil cooler 14 to be cooled. The cooling oil then enters the transmission 6 to lubricate and cool the transmission 6 and returns to the oil pan 12.

Leading channels 15 and 16 that connect the oil pan 12 and the first and second hydraulic pumps 51 and 52 may be independent of one another as illustrated, but may also diverge from each another halfway through the first and second pumps 51 and 52.

A check valve 19 is provided on a supply channel 18 that starts from the second hydraulic pump 52 and converges with a supply channel 17 from the first hydraulic pump 51.

A relief channel 22 that diverges from between the oil cooler 14 and the transmission 6 is disposed from midway through a return channel 21 from the center brake 11. A relief valve 23 is provided on the relief channel 22.

On the other hand, the third hydraulic pump 53 sucks hydraulic oil from a hydraulic oil tank 24 via a leading channel 25 and feeds the hydraulic oil to the hydraulic motor 54 via a supply channel 26. The supply channel 26 and a return channel 27 that runs from the hydraulic motor 54 to the hydraulic oil tank 24 are connected by a bypass channel 28 that bypasses the hydraulic motor 54. An open/close valve 55 (a flow amount adjuster) is provided on the bypass channel 28.

When the center brake 11 does not need to be cooled, the open/close valve 55 does not feed the hydraulic oil to the hydraulic motor 54 but lets all the hydraulic oil discharged from the third hydraulic pump 53 bypass the hydraulic motor 54 and returns the hydraulic oil to the hydraulic oil tank 24. When the center brake 11 needs to be cooled, the open/close valve 55 lets no hydraulic oil bypass the hydraulic motor 54 or allows hydraulic oil to bypass only to a flow amount determined in accordance with a necessary amount, so that the remaining hydraulic oil is used to drive the hydraulic motor 54 that in turn drives the second hydraulic pump 52.

Hydraulic pressure for a pilot pressure that alters the bypass flow amount by the open/close valve 55 is appropriately generated by an EPC (Electromagnetic Proportional Control) valve 56. The EPC valve 56 alters the pilot pressure based on command current from a controller 57.

The cooling system 50 according to the exemplary embodiment includes the first to third hydraulic pumps 51 to 53 and the hydraulic motor 54, as well as the open/close valve 55, the EPC valve 56 and the controller 57 therefor.

In the above configuration, when the center brake 11 is not in operation and requires no cooling, as discussed earlier, all the hydraulic oil bypasses the hydraulic motor 54 via the open/close valve 55 to drive only the first hydraulic pump 51 without driving the second hydraulic pump 52, so that an amount of the cooling oil to be supplied is minimized to an extent required to cool the center brake 11 and lubricate and cool the transmission 6 during the normal driving conditions.

On the other hand, when the center brake 11 is in operation and requires further positive cooling when, for instance, service brakes and a retarder are put in operation, the bypass flow amount is restricted to drive the hydraulic motor 54 that in turn drives the second hydraulic pump 52. Cooling oil from the second hydraulic pump 52 is then allowed to converge with cooling oil from the first hydraulic pump 51 to make up for an insufficient amount, so that the center brake 11 is cooled by a larger desired amount of cooling oil.

Here, a capacity of the third hydraulic pump 53 is significantly smaller than that of the second hydraulic pump 52, in consideration of a relation with the hydraulic motor 54. Conventionally, a hydraulic pump of a large capacity equivalent to a combination of the first and second hydraulic pumps 51 and 52 has been driven at all times. In this exemplary embodiment, however, in addition to the first hydraulic pump 51 capable of discharging cooling oil of a minimal amount required to lubricate the transmission 6, only the third hydraulic pump 53 of a smaller capacity than that of the second hydraulic pump 52 is driven.

Consequently, when it is not necessary to positively cool the braking system 11 and all hydraulic oil bypasses by the open/close valve 55 during the normal driving conditions and the like, the third hydraulic pump 53 is driven without any loads imposed, so that the power consumed when the first and third hydraulic pumps 51 and 53 are driven is significantly reduced and so are loads charged on the engine 5, thereby reliably improving fuel efficiency.

The following is an illustrative description of effects of the invention.

First, pump consumption power is expressed by the below formula (1).

$$\text{(pump consumption power)}=\text{(pump discharge pressure)}\times\text{(flow amount)}\times\text{(pump rotational speed)} \quad (1)$$

Here, since a flow amount is proportional to pump capacity and so is pump rotational speed to engine speed, pump consumption power at certain engine speed is proportional to (pump discharge pressure) multiplied by (pump capacity).

Now, it is tentatively supposed that pump discharge pressures of a conventional large capacity hydraulic pump is "1" when brake is on and is "0.5" when brake is off (driving a dump truck under normal conditions). Pump discharge pressure is generated largely by pressure loss at the braking system 11 and the oil cooler 14 as well as pressure drop by lubrication at the transmission 6. The first hydraulic pump 51 according to this exemplary embodiment rotates at a discharge pressure of "0.5" when brake is off Pump discharge pressure by the third hydraulic pump 53 according to this exemplary embodiment when brake is off is set approximately at "0.2" because all flows bypass.

Furthermore, pump capacities of a conventional hydraulic pump and the first to third hydraulic pumps 51 to 53 according to this exemplary embodiment are postulated as follows.

Conventional hydraulic pump "100"
First hydraulic pump "50"
Second hydraulic pump "50"
Third hydraulic pump "10"

Addition of pump capacities of the first and second hydraulic pumps 51 and 52 amounts to a pump capacity of a conventional hydraulic pump. In addition, the third hydraulic pump 53 has a small pump capacity and drives the second hydraulic pump 52 by small-volume high pressure. However, since the third hydraulic pump 53 does not drive the second hydraulic pump 52 when brake is off, the third hydraulic pump 53 rotates at a low pump discharge pressure of "0.2" (discussed above).

Accordingly, pump consumption power by a conventional hydraulic pump when brake is off is calculated as: "0.5" (pump discharge pressure)×"100" (pump capacity)="50."

On the other hand, pump consumption power in this exemplary embodiment when brake is off is calculated as: ("0.5" (pump discharge pressure by the first hydraulic pump 51)× "50" (pump capacity))+("0.2" (pump discharge pressure by the third hydraulic pump 53)×"10" (pump capacity))="27."

As a result, this exemplary embodiment enables a substantial cut in the pump consumption power when driving a dump truck under normal conditions and increases fuel efficiency.

The first and third hydraulic pumps 51 and 53 are attached to a PTO (Power Take-Off) (not shown) that is installed to the transmission 6, where the first and third hydraulic pumps 51 and 53 are accommodated in a small space between the PTO and the engine 5 and are driven by the engine 5 via the PTO.

On the other hand, the second hydraulic pump 52 and the hydraulic motor 54 constitute a unit connected via a joint and are remotely attached to a predetermined position on the transmission 6. The above configuration eliminates a need of accommodating the second hydraulic pump 52 and the hydraulic motor 54 between the PTO and the engine 5, thereby increasing freedom in layouts to save space.

Figure 3:
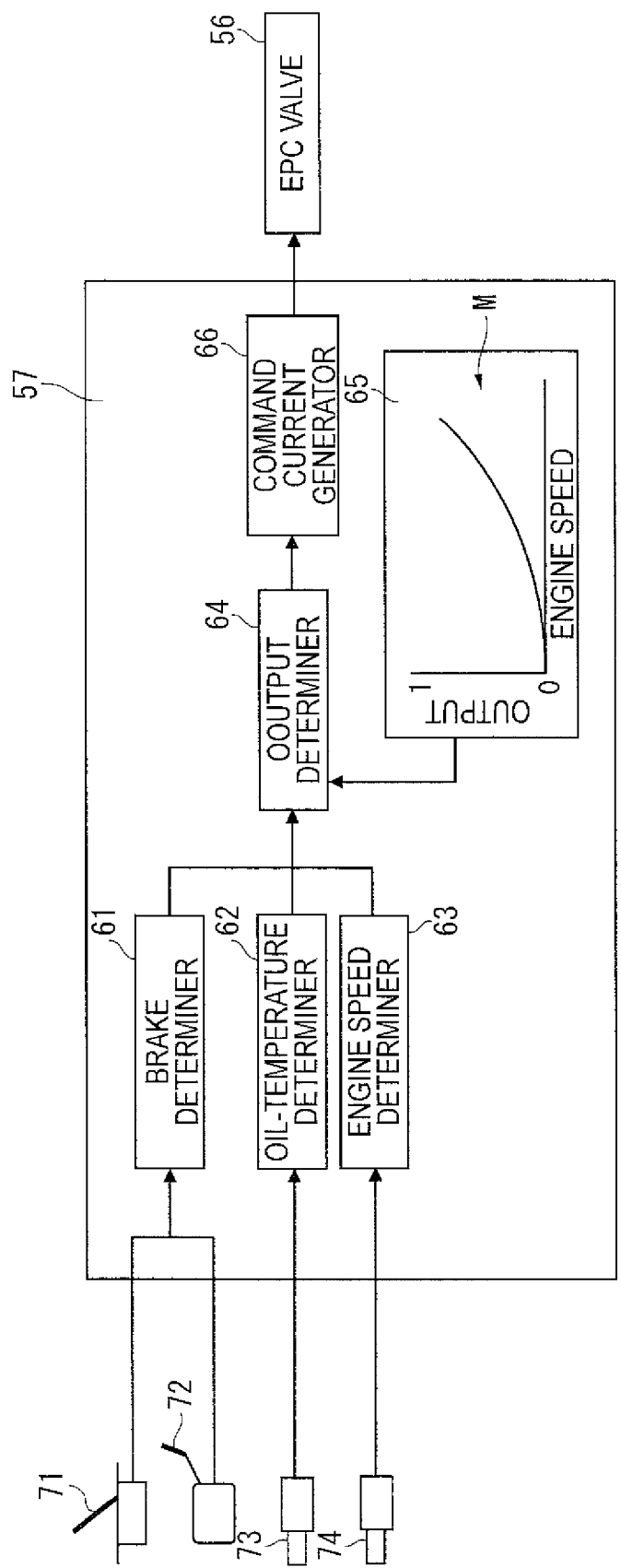
FIG. 3 is a block diagram that shows a controller according to the exemplary embodiment.

Next, a description of the controller 57 will be provided with reference to FIG. 3 as follows.

The controller 57 produces command current to the EPC valve 56 in accordance with operational statuses of service brakes and a retarder, oil temperatures of cooling oil and engine speeds, and regulates a bypass flow amount at the open/close valve 55.

Though not illustrated, the controller 57 includes: an input interface to convert and reshape various input signals; a computer that consists mainly of a micro computer and a high-speed numeric data processor and performs arithmetical and logical calculations of input data according to a predetermined procedure; and an output interface to convert the calculated results into command current that is output. The controller 57 according to this exemplary embodiment includes a brake determiner 61, an oil-temperature determiner 62, an engine speed determiner 63, an output determiner 64, a memory portion 65 and a command current generator 66.

The brake determiner 61 monitors operational signals from a brake pedal 71 (brake operating unit of service brakes) and operational signals from a retarder control lever 72 that serves as a brake operator when the center brake 11 is used as a retarder, so as to determine whether the center brake 11 is in operation.

The oil-temperature determiner 62 monitors detection signals from an oil-temperature detector 73 including an oil-temperature sensor that detects oil temperatures of cooling oil, and determines whether the oil temperature of cooling oil exceeds a predetermined temperature T0.

The engine determiner 63 monitors detection signals from an engine speed detector 74 including an engine speed sensor that is provided on the engine 5 or the transmission 6, so as to determine whether the engine speed of the engine 5 is a rated engine speed or less.

The output determiner 64 determines and outputs an output value ranging between 0 and 1 based on the results determined by each of the determiners 61 to 63. An output value of "1" is for keeping the second hydraulic pump 52 out of operation by fully opening the open/close valve 55 so that all hydraulic oil from the third hydraulic pump 53 is not fed to but bypasses the hydraulic motor 54. An output value of "0" is for driving the second hydraulic pump 52 to the fullest extent by fully closing the open/close valve 55 so that all hydraulic oil from the third hydraulic pump 53 is fed to the hydraulic motor 54.

More specifically, for instance, when no operational signals are output from the brake pedal 71 or the retarder control lever 72 and the brake determiner 61 determines that the center brake 11 is out of operation, the output determiner 64 outputs an output value "1" to halt the second hydraulic pump 52, so that no unneeded cooling oil is supplied to the center brake 11. On the other hand, with operational signals being output and a determination being made that the center brake 11 is in operation, the output determiner 64 outputs an output value "0" for the second hydraulic pump 52 to supply cooling oil to the center brake 11 for cooling.

When the oil-temperature determiner 62 determines that the oil temperature of cooling oil is the temperature T0 or less, the output determiner 64 outputs an output value "1" to keep the second hydraulic pump 52 from supplying the cooling oil. When the oil-temperature determiner 62 determines that an oil temperature of the cooling oil exceeds the temperature T0, the output determiner 64 outputs an output value "0" for the second hydraulic pump 52 to supply the cooling oil.

Cooling oil at or below the temperature T0 has high viscosity, thus increasing circuit resistance. A cooling oil chamber into which the cooling oil in the center brake 11 flows is sealed off from outside by a floating seal. When a significant amount of cooling oil of high viscosity and low temperatures is supplied to the center brake 11, fluidity in the return channel 21 is lowered so that back pressure therein increases, thus raising internal pressure in the cooling oil chamber and leading to leakage of the cooling oil to the outside through the floating seal.

In particular, when a temperature of the cooling oil is low, the engine 5 frequently needs a warm-up operation, in which an idling speed of the engine 5 is likely to be set at a high idling speed. Accordingly, caution needs to be taken because a significant amount of highly viscous cooling oil is supplied.

In other words, the temperature T0 is a temperature set to determine whether conditions of cooling oil are not suited to cooling in terms of viscosity.

On a flip side, since cooling oil of low temperatures is highly viscous but can cool efficiently even to a small amount thereof, even a small amount of cooling oil discharged from the first hydraulic pump 51 can sufficiently cool the center brake 11. Consequently, when the oil temperature is low, a significant amount of cooling oil does not need to be supplied to the center brake 11. From the above viewpoint as well, when an oil temperature is the temperature T0 or less, the cooling oil is not supplied from the second hydraulic pump 52 to keep the floating seal from being damaged.

Meanwhile, the oil-temperature detector 73 is provided in a position that allows the oil-temperature detector 73 to detect, for instance, the oil temperature of cooling oil downstream immediately from the center brake 11 or the oil temperature of cooling oil stored in the oil pan 12, both along the return channel 21.

Furthermore, when the engine speed determiner 63 determines that the engine speed exceeds a rated speed, the output determiner 64 determines an output value in a 0-to-1 range in accordance with the given engine speed and adjusts the bypass flow amount at the open/close valve 55 to restrict an amount of cooling oil discharged from the second hydraulic pump 52.

When the engine speed far exceeds the rated speed, the first hydraulic pump 51 and the third hydraulic pump 53 run at a higher speed than required, resulting in an oversupply of cooling oil's flow amount to the center brake 11, so that an inner pressure in the cooling oil chamber could rise and cooling oil may leak out as a result of damage caused to the floating seal. To prevent the situation, the bypass flow amount is adjusted so that driving of the second hydraulic pump 52 and the hydraulic motor 54 driven by the third hydraulic pump 53, is reined in.

For the above purpose, a map M is stored in the memory portion 65 to determine an output value for an engine speed of a rated speed or more. The output determiner 64 determines an output value by reference to the map M when a detection signal indicating a speed above a rated speed is input. On the map M, the position of zero point on a horizontal axis that indicates an engine speed corresponds to the rated speed. An output value that nears 1 from 0 as an engine speed rises above the rated speed is determined for a bypass flow amount to be adjusted toward a halt of the second hydraulic pump 52.

The command current generator 66 generates command current in accordance with the output value determined by the output determiner 64 and feeds the command current to the EPC valve 56. The command current effects a supply of pilot pressure of an appropriate level of hydraulic pressure to the open/close valve 55 from the EPC valve 56.

Figure 4:
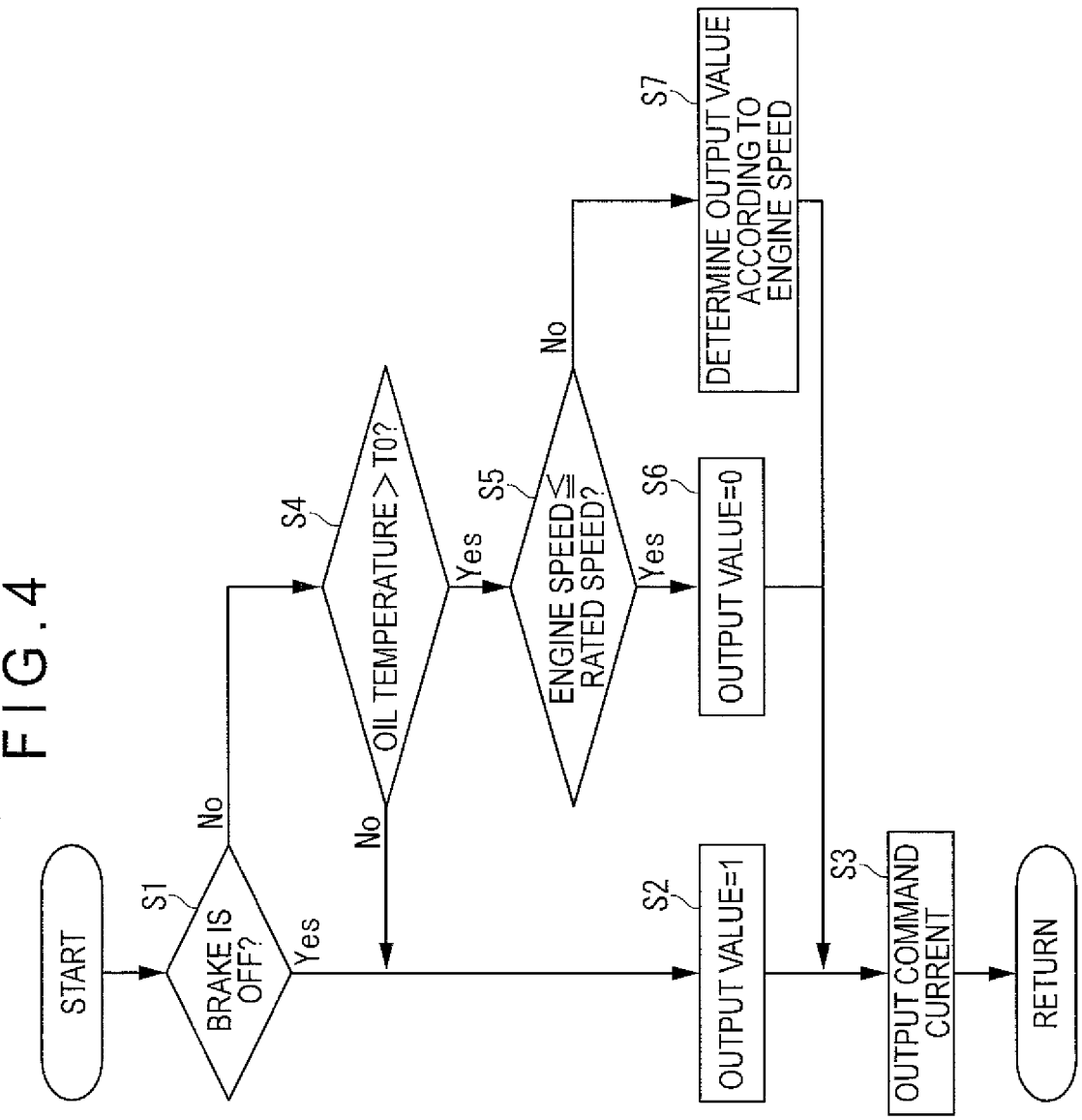
FIG. 4 is a flowchart that shows a control flow in the controller.

A control flow at the controller 57 will be described below by referencing FIG. 4.

First, in step 1 (hereinafter step is abbreviated as "S"), the brake determiner 61 monitors operational signals from the brake pedal 71 of a service brake and the retarder control lever 72 of a retarder and determines whether the center brake 11 is in operation.

"Yes" is a response taken when the center brake 11 is in operation. In the above case, since the center brake 11 is out of operation, a supply of cooling oil to the center brake 11 and the transmission 6 suffices only with cooling oil from the first hydraulic pump 51. The second hydraulic pump 52 is hence suspended. Accordingly, in S2, the output determiner 64 determines an output value of "1" and outputs the output value to the command current generator 66.

In S3, the command current generator 66 generates the command current based on the output value of "1" and outputs the command current to the EPC valve 56. As a result, the EPC valve 56 feeds to the open/close valve 55 pilot pressure for fully opening the open/close valve 55. All hydraulic oil from the third hydraulic pump 53 then bypasses the hydraulic motor 54 to return to the hydraulic oil tank 24, so that the second hydraulic pump 52 is not driven. Hence, when a brake is out of operation, the first hydraulic pump 51 feeds the center brake 11 and the transmission 6 a minimal amount of cooling oil required to lubricate the transmission.

On the other hand, in S1, "No" is a response taken when the brake determiner 61 receives at least one of operational signals from the brake pedal 71 and from the retarder control lever 72 and determines that the center brake 11 is in operation. With the response taken, a procession to S4 takes place. In S4, the oil-temperature determiner 62 monitors detection signals input by the oil-temperature detector 73.

When the oil-temperature determiner 62 determines based on the detection signals that an oil temperature of cooling oil does not exceed the temperature T0, "No" is taken because the cooling oil is highly viscous and an inner pressure at the center brake 11 could rise to such a level that damages floating seal. With a shift to S2 and S3, the second hydraulic pump 52 is not driven and the cooling oil is supplied only from the first hydraulic pump 51.

On the other hand, when the oil-temperature determiner 62 determines that an oil temperature of the cooling oil exceeds the temperature T0, "Yes" is taken because the cooling oil has low viscosity and an inner pressure at the center brake 11 could not rise to the level that damages floating seal, in which a procession to S5 occurs.

In S5, the engine speed determiner 63 monitors detection signals from the engine speed detector 74. When an engine speed is a rated speed or less, "Yes" is taken. In S6, the output determiner 64 determines an output value of "0" and outputs the output value to the command current generator 66.

In this case, since the output value determined in S6 is "0," the command current generator 66 does not generate the command current in S3 so that the command current generator 66 does not output any command current to the EPC valve 56. As a result, the EPC valve 56 does not feed pilot pressure to the open/close valve 55, leading to the full closure of the open/close valve 55.

All hydraulic oil from the third hydraulic pump 53 is therefore supplied to the hydraulic motor 54 to drive the second hydraulic pump 52. In other words, when the oil temperature is sufficiently high and the engine speed is a rated speed or below while the brake is in operation, cooling oil from the second hydraulic pump 52 is fed to the center brake 11 to make up for any insufficiency in addition to a minimum required amount of cooling oil from the first hydraulic pump 51.

However, when an engine speed is determined to exceed the rated speed in S5, the output determiner 64 determines the output value based on the map M in accordance with the engine speed in S7. Furthermore, in S3, the command current is generated based on the determined output value and is output to the EPC valve 56.

Some of the hydraulic oil from the third hydraulic pump 53 bypasses at the open/close valve 55. The rest of the hydraulic oil from the third hydraulic pump 53 is used to drive the hydraulic motor 54 and the second hydraulic pump 52, so that the second hydraulic pump 52 feeds a required amount of cooling oil, combined with that from the first hydraulic pump 51, to the center brake 11

According to this exemplary embodiment described above, in contrast to conventional models, a hydraulic pump with a large pump consumption power is not constantly driven while the center brake 11 is out of operation, but the first and third hydraulic pumps 51 and 53 whose combined pump consumption power is sufficiently reduced are driven, resulting in smaller loads applied on the engine 5 and improved fuel efficiency.

In addition, for instance, when the center brake 11 is put in operation by turning on a retarder (e.g. driving downhill), the engine 5 simply follows a rotation of the wheel 10 and an engine brake is in operation. Accordingly, the engine is maintained at a level sufficient to drive the third hydraulic pump 53 while fuel injection into the engine 5 is reduced. Thus, a retarder can be operated simultaneously with an engine brake, so that two types of braking systems can be effectively used in braking a vehicle and fuel efficiency is not lowered.

Furthermore, when the oil temperature of the cooling oil is too low or the engine speed exceeds the rated speed, since the second hydraulic pump 52 is either not driven or not fully driven, neither of cooling oil of high viscosity nor an excess amount of cooling oil is supplied, so that an excessive rise in inner pressure at a cooling oil chamber is restrained and damage to floating seal is prevented, thus forestalling leakage of cooling oil.

The present invention is not limited to the above-mentioned exemplary embodiment, but includes modifications, improvements and the like as far as an object of the invention can be achieved.

For instance, in the above exemplary embodiment, the bypass flow amount at the open/close valve 55 is adjusted based on the oil temperature of cooling oil and the engine speed. However, the flow amount may be adjusted in the invention at least in accordance with operational statuses of brake operating units such as the brake pedal 71 and the retarder control lever 72 without adjusting the flow amount based on the oil temperature or the engine speed.

In the above exemplary embodiment, though the open/close valve 55 is used to adjust the bypass flow amount, an electromagnetic proportional valve may also be used instead of the open/close valve 55.

In the above exemplary embodiment, the second hydraulic pump 52 and the hydraulic motor 54 are attached to a predetermined position of the transmission 6. However, alternative arrangement is possible in which, for instance, the second hydraulic pump 52 and the hydraulic motor 54 are attached to a predetermined position of the front frame 2, along which piping is arranged to provide a channel for hydraulic oil, thus enabling driving in a remote manner.

In the above exemplary embodiment, the center brake 11 is provided on the front rear wheel 10B as a braking system of the invention. However, a front brake of the front wheel 10A and a rear brake of the rear rear wheel 10C may be a braking system for which a cooling system of the invention is adopted.

Though the oil pan 12 of the transmission 6 is used as a cooling oil tank of the invention in the above exemplary embodiment, a separate cooling oil tank for storing cooling oil may be provided and the cooling oil may be supplied to a braking system and a transmission.

The invention claimed is:

1. A dump truck comprising:
a cooling oil tank for storing cooling oil;
a braking system to which the cooling oil is supplied;
a transmission to which the cooling oil is supplied via the braking system;
a first hydraulic pump that is driven by an engine and supplies the cooling oil in the cooling oil tank to the braking system and the transmission;
a second hydraulic pump that supplies the cooling oil in the cooling oil tank, in addition to the cooling oil from the first hydraulic pump, to the braking system and the transmission;
a hydraulic motor whose output axis is connected to an input axis of the second hydraulic pump;
a hydraulic oil tank for storing hydraulic oil;
a third hydraulic pump that is driven by the engine and supplies the hydraulic oil in the hydraulic oil tank to the hydraulic motor;
a flow amount adjuster that is provided along a bypass channel that lets a predetermined amount of the hydraulic oil from the third hydraulic pump bypass the hydraulic motor and adjusts a bypass flow amount in the bypass channel; and
a controller that controls the bypass flow amount at the flow amount adjuster based on a brake status in the braking system,
a capacity of the first hydraulic pump corresponding to a flow amount of the cooling oil required to lubricate the transmission,
a capacity of the second hydraulic pump corresponding to a flow amount of the cooling oil to make up for the cooling oil from the first hydraulic pump in order to provide the cooling oil supplied when the braking system is in operation, and
a capacity of the third hydraulic pump being smaller than a capacity of the second hydraulic pump.

2. The dump truck according to claim 1, wherein the controller determines the brake status in the braking system based on operational signals from a brake operating unit.

3. The dump truck according to claim 2, wherein the controller controls the bypass flow amount at the flow amount adjuster based on an oil temperature of the cooling oil.

4. The dump truck according to claim 2, wherein the controller controls the bypass flow amount at the flow amount adjuster based on a speed of the engine.

5. The dump truck according to claim 3, wherein the controller controls the bypass flow amount at the flow amount adjuster based on a speed of the engine.

* * * * *